United States Patent
Sato

(10) Patent No.: US 11,002,343 B2
(45) Date of Patent: May 11, 2021

(54) TENSIONER

(71) Applicant: TSUBAKIMOTO CHAIN CO., Osaka (JP)

(72) Inventor: Yoji Sato, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 189 days.

(21) Appl. No.: 16/353,199

(22) Filed: Mar. 14, 2019

(65) Prior Publication Data

US 2019/0360559 A1 Nov. 28, 2019

(30) Foreign Application Priority Data

May 28, 2018 (JP) .............................. JP2018-101383

(51) Int. Cl.
*F16H 7/08* (2006.01)
(52) U.S. Cl.
CPC ....... *F16H 7/08* (2013.01); *F16H 2007/0806* (2013.01); *F16H 2007/0814* (2013.01); *F16H 2007/0842* (2013.01); *F16H 2007/0859* (2013.01); *F16H 2007/0891* (2013.01)
(58) Field of Classification Search
CPC ........................... F16H 2007/0812; F16H 7/08
USPC ........................................................ 474/110
See application file for complete search history.

(56) References Cited

U.S. PATENT DOCUMENTS

| 3,960,026 | A | * | 6/1976 | Hibino | F16H 7/12 |
|---|---|---|---|---|---|
| | | | | | 474/110 |
| 4,743,225 | A | * | 5/1988 | Okabe | F16H 7/129 |
| | | | | | 474/133 |
| 4,963,121 | A | * | 10/1990 | Himura | F16H 7/08 |
| | | | | | 474/110 |
| 5,030,169 | A | * | 7/1991 | Kiso | F02B 67/06 |
| | | | | | 474/110 |
| 5,087,225 | A | * | 2/1992 | Futami | F16H 7/08 |
| | | | | | 474/110 |
| 5,090,946 | A | * | 2/1992 | Futami | F16H 7/08 |
| | | | | | 474/104 |
| 5,193,498 | A | * | 3/1993 | Futami | F01L 1/02 |
| | | | | | 123/90.31 |
| 5,277,664 | A | * | 1/1994 | Mott | F16H 7/0848 |
| | | | | | 474/110 |
| 5,346,436 | A | * | 9/1994 | Hunter | F16H 7/0848 |
| | | | | | 474/110 |
| 5,441,457 | A | * | 8/1995 | Tsutsumi | F16H 7/08 |
| | | | | | 474/110 |

(Continued)

FOREIGN PATENT DOCUMENTS

JP 2014-159819 A 9/2014

*Primary Examiner* — Henry Y Liu
(74) *Attorney, Agent, or Firm* — Westerman, Hattori, Daniels & Adrian, LLP

(57) ABSTRACT

Provided is a tensioner capable of reducing a machining or mounting load and preventing leakage of oil from a surface for mounting a tensioner with a simple configuration. A tension body having a plunger-receiving hole into which a plunger is slidably inserted is configured to have a projection portion on a mounting surface that face a wall surface having an oil discharge hole of amounting target object. The projection portion is configured to be inserted into the oil discharge hole and to be continuously connected to the oil supply path formed in the tensioner body to form an oil passage.

5 Claims, 7 Drawing Sheets

(56) References Cited

U.S. PATENT DOCUMENTS

| | | | | |
|---|---|---|---|---|
| 5,512,019 A * | 4/1996 | Shimaya | F16H 7/08 | 474/110 |
| 5,577,970 A * | 11/1996 | Smith | F16H 7/0848 | 474/110 |
| 5,713,809 A * | 2/1998 | Yamamoto | F16H 7/0848 | 474/110 |
| 5,842,943 A * | 12/1998 | Tada | F16H 7/08 | 474/109 |
| 5,860,881 A * | 1/1999 | Tada | F16H 7/08 | 474/101 |
| 5,885,179 A * | 3/1999 | Lewis | F16H 7/08 | 474/110 |
| 5,913,742 A * | 6/1999 | Nakamura | F16H 7/0848 | 474/110 |
| 5,935,031 A * | 8/1999 | Tada | F15B 21/044 | 474/101 |
| 5,954,159 A * | 9/1999 | Nakamura | F01L 1/02 | 184/11.2 |
| 5,967,920 A * | 10/1999 | Dembosky | F01L 1/02 | 474/109 |
| 5,967,921 A * | 10/1999 | Simpson | F16H 7/08 | 474/110 |
| 5,993,342 A * | 11/1999 | Wigsten | F16H 7/08 | 474/110 |
| 6,045,471 A * | 4/2000 | Suzuki | F16H 7/08 | 474/109 |
| 6,093,123 A * | 7/2000 | Baddaria | F01L 1/02 | 474/110 |
| 6,358,168 B1 * | 3/2002 | Tada | F16H 7/08 | 474/101 |
| 6,602,154 B1 * | 8/2003 | Guichard | F16H 7/08 | 474/101 |
| 6,866,601 B2 * | 3/2005 | Saitoh | F16H 7/0836 | 474/109 |
| 6,875,141 B2 * | 4/2005 | Konishi | F16H 7/0836 | 474/101 |
| 6,916,264 B2 * | 7/2005 | Hashimoto | F16H 7/0848 | 474/109 |
| 7,037,228 B2 * | 5/2006 | Yoshida | F16H 7/0848 | 474/109 |
| 7,540,816 B2 * | 6/2009 | Yoshida | F16H 7/0848 | 474/110 |
| 8,221,274 B2 * | 7/2012 | Sato | F16H 7/0836 | 474/110 |
| 8,535,187 B2 * | 9/2013 | Herbert | F16H 7/0848 | 474/110 |
| 8,888,624 B2 * | 11/2014 | Bauer | F16H 7/0848 | 474/110 |
| 8,951,154 B2 * | 2/2015 | Konuma | F16H 7/0848 | 474/110 |
| 8,968,127 B2 * | 3/2015 | Kobayashi | F16H 7/0848 | 474/109 |
| 10,208,838 B2 * | 2/2019 | Crump | F16H 7/12 | |
| 10,400,870 B2 * | 9/2019 | Crump | F01L 1/348 | |
| 2001/0003279 A1 * | 6/2001 | Brandl | F02B 75/22 | 123/90.31 |
| 2001/0007841 A1 * | 7/2001 | Nakakubo | F16H 7/0836 | 474/110 |
| 2002/0037782 A1 * | 3/2002 | Amano | F16H 7/08 | 474/101 |
| 2003/0134703 A1 * | 7/2003 | Saitoh | F16H 7/0836 | 474/109 |
| 2003/0186765 A1 * | 10/2003 | Konishi | F16H 7/0836 | 474/109 |
| 2003/0216202 A1 * | 11/2003 | Emizu | F16H 7/0836 | 474/109 |
| 2004/0266571 A1 * | 12/2004 | Izutsu | F16H 7/0848 | 474/110 |
| 2005/0059517 A1 * | 3/2005 | Poiret | F01L 1/022 | 474/110 |
| 2005/0085323 A1 * | 4/2005 | Lee | F01L 1/024 | 474/110 |
| 2005/0096166 A1 * | 5/2005 | Wakabayashi | F16H 7/0836 | 474/110 |
| 2006/0063625 A1 * | 3/2006 | Emizu | F16H 7/0836 | 474/110 |
| 2006/0089221 A1 * | 4/2006 | Hashimoto | F01L 1/02 | 474/110 |
| 2006/0094548 A1 * | 5/2006 | Sato | F16H 7/0848 | 474/109 |
| 2006/0116229 A1 * | 6/2006 | Sato | F16H 7/0848 | 474/110 |
| 2006/0160645 A1 * | 7/2006 | Markley | F16H 7/0848 | 474/109 |
| 2007/0032322 A1 * | 2/2007 | Beardmore | F16H 7/0848 | 474/110 |
| 2007/0032323 A1 * | 2/2007 | Yoshida | F16H 7/0848 | 474/110 |
| 2007/0287562 A1 * | 12/2007 | Assel | F16H 7/0848 | 474/110 |
| 2008/0248906 A1 * | 10/2008 | Ullein | F16H 7/0836 | 474/110 |
| 2008/0318717 A1 * | 12/2008 | Kurematsu | F16H 7/0848 | 474/110 |
| 2009/0017949 A1 * | 1/2009 | Sato | F16H 7/0836 | 474/111 |
| 2010/0298077 A1 * | 11/2010 | Hirayama | F01L 1/02 | 474/110 |
| 2010/0298078 A1 * | 11/2010 | Hirayama | F16H 7/0848 | 474/110 |
| 2011/0251001 A1 * | 10/2011 | Kobayashi | F16H 7/0848 | 474/110 |
| 2011/0263366 A1 * | 10/2011 | Botez | F16H 7/0848 | 474/110 |
| 2013/0324337 A1 * | 12/2013 | Yoshida | F16H 7/0836 | 474/110 |
| 2013/0331214 A1 * | 12/2013 | Crump | F16K 15/044 | 474/110 |
| 2014/0100068 A1 * | 4/2014 | Kurematsu | F16H 7/0836 | 474/110 |
| 2014/0200104 A1 * | 7/2014 | Kurematsu | F16H 7/08 | 474/110 |
| 2015/0267789 A1 * | 9/2015 | Kurematsu | F16H 7/08 | 474/110 |
| 2015/0292602 A1 * | 10/2015 | Kurematsu | F16H 7/0848 | 474/110 |
| 2015/0354674 A1 * | 12/2015 | Markley | F16H 7/0848 | 474/110 |
| 2016/0123435 A1 * | 5/2016 | Yoshida | F16H 7/08 | 474/110 |
| 2016/0153530 A1 * | 6/2016 | Kitamura | F16H 7/08 | 474/110 |
| 2016/0186838 A1 * | 6/2016 | Kurematsu | F16H 7/08 | 474/110 |
| 2016/0290447 A1 * | 10/2016 | Kunimatsu | F16K 17/02 | |
| 2018/0313434 A1 * | 11/2018 | Watanabe | F16H 7/08 | |

\* cited by examiner

FIG. 5
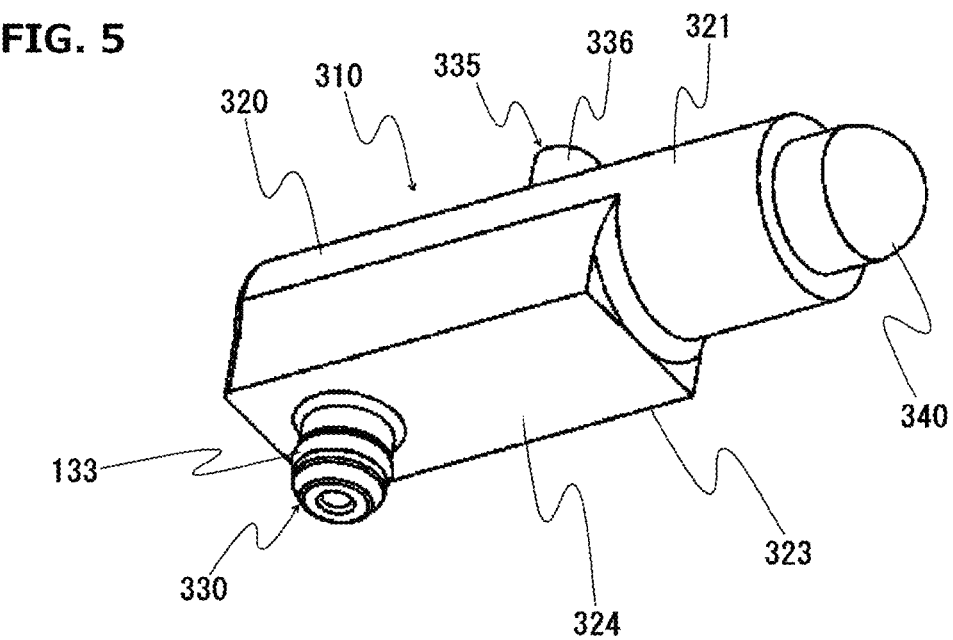
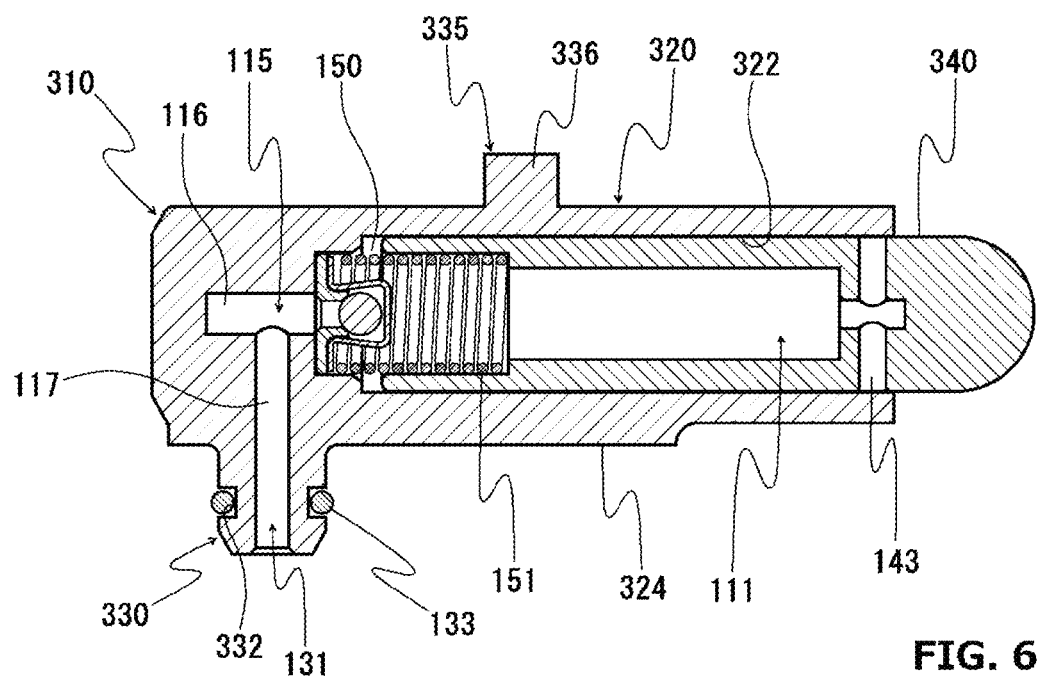
FIG. 6

TENSIONER

BACKGROUND OF THE INVENTION

1. Field of the Invention

The present invention relates to a tensioner used to provide proper tension to a transmission belt or a transmission chain in a timing system of an engine or the like.

2. Description of the Related Art

In a transmission device used in a timing system of an engine or the like, tensioners for providing proper tension to a loose side of a transmission belt or a transmission chain to prevent vibrations generated during running have been conventionally widely used.

As such tensioners, some tensioners has been known, for example, a tensioner including a tensioner body with a plunger-receiving hole in which one end is opened, a cylindrical plunger slidably inserted into the plunger-receiving hole, and a biasing unit to bias the plunger in a protrusion direction of the plunger, and supplies pressure oil to an oil chamber defined by the tensioner body and the plunger, to obtain a damping effect by oil, biasing force by hydraulic pressure, and a lubrication effect by the oil.

In the above tensioner, a plurality of mounting sections each having a mounting hole into which a bolt or the like for fixing the tensioner to a mounting target object is inserted are formed in the tensioner body, and the tensioner is fixed to, e.g., a wall surface having an oil discharge outlet in an engine block that serves as the mounting target object by using the bolt.

In the structure for mounting a tensioner as described above, it has been known that, in order to make the flow of the pressure oil smooth and improve oil filling performance upon actuation of an engine, an oil reservoir section is formed on a surface for mounting a tensioner in the engine block (see, e.g., Japanese Patent Application Publication No. 2014-159819).

SUMMARY OF THE INVENTION

A mounting surface in the tensioner body is formed to be, e.g., a flat surface, and the mounting surface is attached onto a surface for mounting a tensioner of the mounting target object by metal touch. Thus, high machining accuracy is required for both of the mounting surface in the tensioner body and the surface for mounting a tensioner of the mounting target object, and it is practically difficult to form a completely-sealed structure. Consequently, a problem arises in that, when the engine is left to stand for a long time (the engine is stopped for a long time), oil may leak from an interface between the tensioner and the engine block. In order to prevent such leakage of the oil, it is necessary to interpose, e.g., a metal gasket between the tensioner and the engine block that serves as the mounting target object, and a machining or mounting load will be increased.

Further, when the oil reservoir section is formed on the engine block side, the shape of the engine block side often becomes complicated.

The present invention is made for solving such problems, and an object of the present invention is to provide a tensioner capable of reducing a machining or mounting load and preventing leakage of oil from a surface for mounting a tensioner with a simple configuration.

The present invention is a tensioner including: a tensioner body provided with an oil supply path for external pressure oil formed therein, the oil supply path communicating with a plunger-receiving hole, one end of which is opened; a plunger slidably inserted into the plunger-receiving hole; and a biasing unit to bias the plunger in a protruding direction of the plunger from the plunger-receiving hole, wherein the tensioner body has a projection portion on a mounting surface configured to face a wall surface having an oil discharge hole in a mounting target object, the projection portion being configured to be inserted into the oil discharge hole and to be continuously connected to the oil supply path to form an oil passage, whereby the present invention solves the above problems.

According to the configuration as recited in claim 1, side sealing can be achieved due to the outer peripheral surface of the projection portion and the oil discharge hole of the mounting target object. As a result, high accuracy is not necessarily required upon machining the mounting surface which will face the mounting target object of the tensioner body, and it is possible to reduce a machining or mounting load and to reduce the number of components with a simple configuration in which a projection portion that forms the oil passage continuously connected to an oil supply path formed in the tensioner body is provided in the tensioner body.

In addition, the projection portion formed on the tensioner body serves as a fixing point (a pivot) of the tensioner in the mounting target object, and it is thus possible to reduce the number of mounting sections to be formed in the tensioner body, and simplify the shape of the tensioner body. Thus, it is possible to reduce weight, to facilitate manufacture, and to save manufacturing cost.

Further, it is not necessary to form an oil reservoir section or a seal line section on the wall surface having the oil discharge hole in the mounting target object and the tensioner body, and only drilling in the mounting target object is required. Thus, machining of a tensioner mounting section in the mounting target object and the manufacture of the tensioner body are facilitated.

According to the configuration as recited in claim 2, it is possible to form a highly-reliable sealing structure without using a metal gasket or the like, and leakage of oil from the surface for mounting a tensioner is surely prevented.

According to the configuration as recited in claim 3, it is possible to prevent the tensioner from being disconnected from the mounting target object even without fixing the tensioner to the mounting target object using a bolt, and it is thus not necessary to form the mounting section to be fitted to the mounting target object in the tensioner body. Consequently, it is possible to further simplify the shape of the tensioner body and significantly reduce weight. In addition, excessive swing of the tensioner around the cylindrical projection portion is prevented by the swing prevention structure section formed in the tensioner body. Thus, even when the transmission chain or the transmission belt is stretched as it is used and the tensioner is thereby caused to swing, it is possible to maintain a proper contact state between the plunger and a plunger-receiving section.

According to the configuration as recited in claim 4, it is possible to surely prevent the excessive swing of the tensioner with a simple configuration without hindering the function of the tensioner.

According to the configuration as recited in claim 5, even when the tensioner swings around the projection portion due to change in tension of the transmission chain or the transmission belt, it is possible to always press the plunger against the center of the plunger-receiving section, and to thereby obtain stable tension-providing function.

BRIEF DESCRIPTION OF THE DRAWINGS

FIG. 5 is a perspective view showing an example of the configuration of the tensioner according to a second embodiment of the present invention when the tensioner is viewed from the side of the mounting surface to face the mounting target object;

FIG. 6 is an axial cross-sectional view of the tensioner shown in FIG. 5;

DESCRIPTION OF THE PREFERRED EMBODIMENTS

Any specific configuration may be adopted as a configuration of the tensioner according to the present invention, as long as it is a configuration of a tensioner including a tensioner body that includes an oil supply path for external pressure oil formed therein, the oil supply path communicating with a plunger-receiving hole, one end of which is opened, a plunger slidably inserted into the plunger-receiving hole, and a biasing unit to bias the plunger in a protruding direction of the plunger from the plunger-receiving hole, wherein the tensioner body has a projection portion on a mounting surface configured to face a wall surface having an oil discharge hole in a mounting target object, the projection portion being configured to be inserted into the oil discharge hole and to be continuously connected to the oil supply path to form an oil passage, and as long as the tensioner having such a configuration is capable of reducing a machining or mounting load and preventing leakage of oil from a surface for mounting a tensioner with a simple configuration.

Hereinbelow, embodiments of the tensioner according to the present invention will be described based on the drawings.

Figure 1:
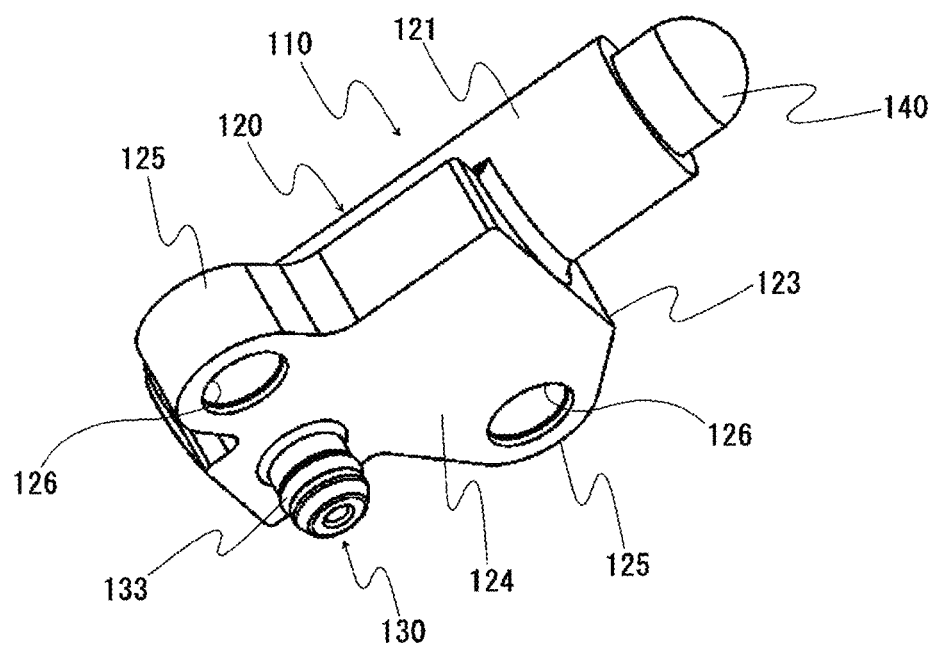
FIG. 1 is a perspective view showing an example of the configuration of a tensioner according to a first embodiment of the present invention when the tensioner is viewed from the side of a mounting surface which will face a mounting target object.
Figure 2:
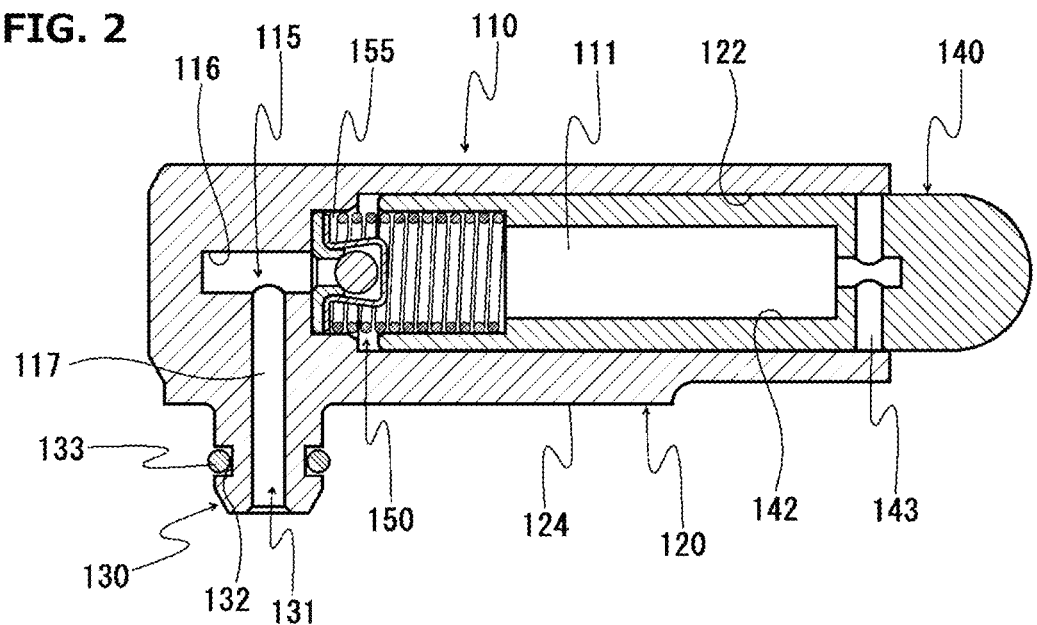
FIG. 2 is an axial cross-sectional view of the tensioner shown in FIG. 1.

FIG. 1 is a perspective view showing an example of the configuration of a tensioner according to a first embodiment of the present invention when the tensioner is viewed from the side of a mounting surface which will face a mounting target object. FIG. 2 is an axial cross-sectional view of the tensioner shown in FIG. 1.

This tensioner 110 includes a tensioner body 120 that is provided with an oil supply path 115 for external pressure oil communicating with a plunger-receiving hole 122, one end of which is opened, a plunger 140 slidably inserted into the plunger-receiving hole 122, and a biasing unit 150 to bias the plunger 140 in the direction of protrusion from the plunger-receiving hole 122.

The tensioner body 120 has a cylindrical main body section 121 that defines the plunger-receiving hole 122 having an open front end, and a flat plate-like base section 123 that is formed integrally with the main body section 121. In this example, the base section 123 is formed such that the main body section 121 is positioned on one surface of the base section 123, and the base section 123 extends outward from both sides of the main body section 121 in plan view. Each of the extension portions in the base section 123 is provided with a fixing bolt insertion mounting hole 126, and a mounting section 125 fitted to the mounting target object is thereby constituted.

The other surface of the base section 123 is a flat surface and constitutes a mounting surface 124 that will face a wall surface having an oil discharge hole in the mounting target object (a surface for mounting a tensioner) by metal touch.

The oil supply path 115 in the tensioner body 120 is constituted by an oil supply hole 116 that is formed in the rear end wall of the main body section 121, is connected to the plunger-receiving hole 122, and extends outward in an axial direction, and an oil introduction hole 117 that is formed so as to extend in the thickness direction of the base section 123 and communicates with the oil supply hole 116.

The plunger 140 is formed into a cylindrical shape and has a plunger hole 142 that is opened at its rear side.

The plunger 140 includes an external relief hole 143 that communicates with the external space of the tensioner 110. One end of the external relief hole 143 is opened at the front top surface of the plunger hole 142, and the other end thereof is opened at the outer peripheral surface of the plunger 140 in a radial direction.

The plunger 140 is inserted in the plunger-receiving hole 122 from its open-end side and is disposed, and a pressure oil chamber 111 is formed between the plunger-receiving hole 122 and the plunger hole 142, i.e., the pressure oil chamber 111 is defined by the internal space of the plunger-receiving hole 122 and the internal space of the plunger hole 142.

On the side of the bottom of the tensioner body 120, there is disposed a check valve 155 constituting a check valve that allows oil to flow into the pressure oil chamber 111 from the outside through the oil supply path 115, and prevents the oil from flowing out from the pressure oil chamber 111.

Figure 3:
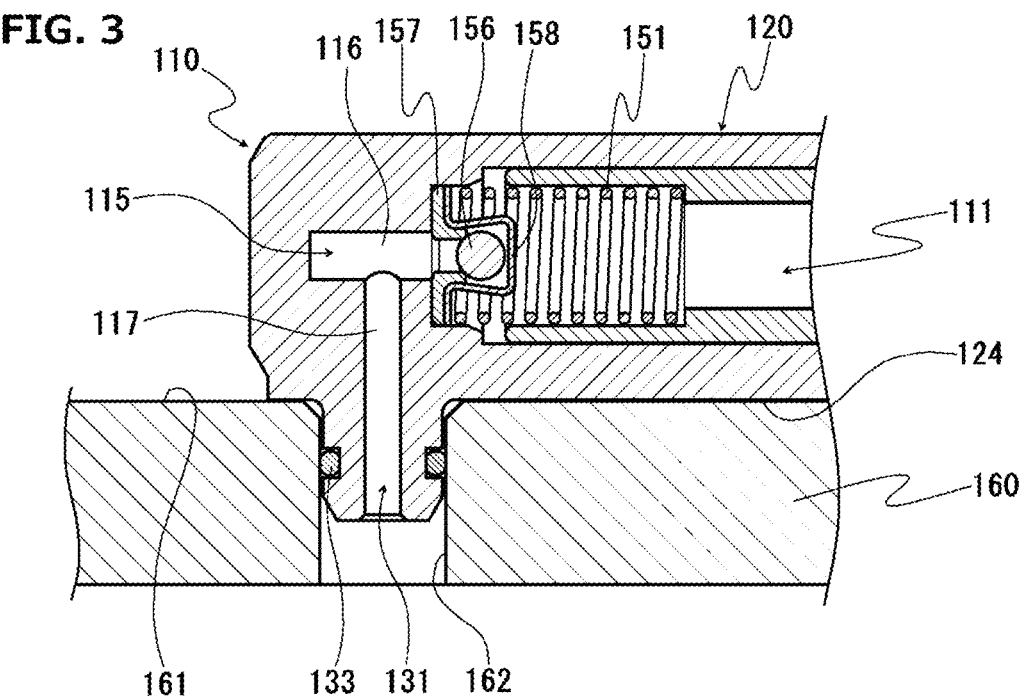
FIG. 3 is a cross-sectional view schematically showing a mounting structure of the tensioner shown in FIG. 1 to be fitted to the mounting target object.

As shown in FIG. 3, the check valve 155 is constituted by a check ball 156, a ball seat 157 having a seating section in which the check ball 156 is seated, and a retainer 158 that guides the check ball 156. Note that a ball spring to bias the check ball 156 to the side of the ball seat 157 may be disposed between the check ball 156 and the retainer 158.

The biasing unit 150 is configured to bias the plunger 140 to the front side, and is constituted by, e.g., a coil spring 151.

The coil spring 151 is disposed in the pressure oil chamber 111 such that a coil axis extends along the central axis of the plunger 140.

The tensioner 110 described above has a projection portion 130 that forms an oil passage 131 connected to the oil supply path 115 on the other surface of the base section 123 constituting the mounting surface 124 of the tensioner body 120, which is to be fitted to the mounting target object.

The projection portion 130 has, e.g., a cylindrical shape, and is formed integrally with the other surface of the base section 123 such that the oil passage 131 formed of the internal space of the projection portion 130 is connected to the oil introduction hole 117 constituting the oil supply path 115.

A concave groove 132 that extends over the entire circumferential periphery is formed in the outer peripheral surface of the projection portion 130, and an annular seal member 133, for example, constituted by an O-ring, is provided in the concave groove 132.

In the tensioner 110 of the present embodiment, although a material constituting each of the tensioner body 120 and the plunger 140 is not particularly limited, the weight of the tensioner 110 can be reduced and manufacture of the tensioner 110 is facilitated by using, e.g., a resin material. As such a resin material, a resin material displaying excellent heat resistance is preferable and, specifically, it is possible to use, e.g., polyamide resins such as nylon 46, nylon 66, and glass fiber reinforced nylon.

In the tensioner 110 of the present embodiment, as shown in FIG. 3, the projection portion 130 in the tensioner body 120 is inserted into, e.g., an oil discharge hole 162 formed in a surface 161 for mounting a tensioner, which is constituted by a flat wall surface in an engine block 160 serving as the mounting target object, and the other surface of the base section 123 in the tensioner body 120 is joined to the surface 161 for mounting a tensioner of the engine block 160. This leads to deformation and crush of the seal member 133 provided on the outer peripheral surface of the projection portion 130, to thereby forma sealing structure by side sealing.

In addition, a fixing bolt (not shown) is mounted to each of the mounting sections 125 in the tensioner body 120, and the tensioner 110 is mounted to the engine block 160 in a state in which the tensioner 110 is prohibited from rotating (swinging) around the cylindrical projection portion 130.

Figure 4:
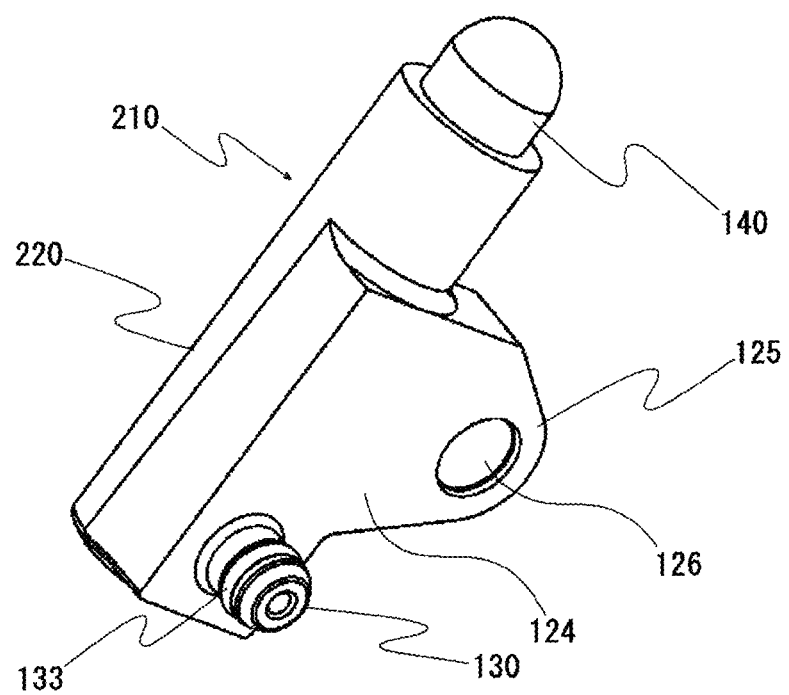
FIG. 4 is a perspective view showing another example of the configuration of the tensioner according to the first embodiment of the present invention when the tensioner is viewed from the side of the mounting surface which will face the mounting target object.

In the tensioner 110 of the present embodiment, the mounting sections 125 at two locations are formed in the tensioner body 120. However, the projection portion 130 functions as a fixed point, and thus, when the tensioner body 120 has the projection portion 130, it is possible to reduce the number of the mounting sections 125 to be formed in the tensioner body 120. For example, as in a tensioner 210 shown in FIG. 4, the mounting section 125 formed in a tensioner body 220 may be provided only at one location. In addition, in the tensioner of the present invention, by adopting a configuration in which the tensioner body has a swing prevention structure section, or by mounting a proper swing prevention member to the mounting target object together with the tensioner, it is possible to adopt a configuration in which the tensioner body does not have the mounting section.

FIG. 5 is a perspective view showing an example of the configuration of the tensioner according to a second embodiment of the present invention when the tensioner is viewed from the side of the mounting surface which will face the mounting target object. FIG. 6 is an axial cross-sectional view of the tensioner shown in FIG. 5.

The basic structure of a tensioner 310 is identical to that of the tensioner 110 according to the first embodiment described above except that a tensioner body 320 does not have the mounting section to be fitted to the mounting target object, which is fitted using a fixing bolt, and the tensioner body 320 has a swing prevention structure section 335 that prevents the swing of the tensioner 310 with respect to the mounting target object.

The tensioner body 320 in the tensioner 310 of the present embodiment has a cylindrical main body section 321 that defines a plunger-receiving hole 322 having an open front end in which a cylindrical plunger 340 is slidably received, and a flat plate-like base section 323 that is formed integrally with the main body section 321. In this example, the base section 323 is formed such that the main body section 321 is positioned on one surface of the base section 323, and the base section 323 is disposed in a width area of the main body section 321 in plan view.

The other surface of the base section 323 is a flat surface and constitutes a mounting surface 324 that will face the surface for mounting a tensioner constituted by the flat wall surface having the oil discharge hole in the mounting target object by metal touch.

In addition, in the tensioner body 320, the oil supply path 115 for the external pressure oil communicating with the plunger-receiving hole 322 is formed. The oil supply path 115 in this example is constituted by the oil supply hole 116 that is formed in the rear end wall of the main body section 321, is connected to the plunger-receiving hole 322, and extends outward in the axial direction, and the oil introduction hole 117 that is formed so as to extend in the thickness direction of the base section 323 and communicates with the oil supply hole 116.

The tensioner 310 has a projection portion 330 that forms the oil passage 131 connected to the oil supply path 115 on the other surface of the base section 323 constituting the mounting surface 324 of the tensioner body 320, which will face the mounting target object.

The projection portion 330 has, e.g., a cylindrical shape and is formed integrally with the other surface of the base section 323 such that the oil passage 131 formed of the internal space of the projection portion 330 is connected to the oil introduction hole 117 constituting the oil supply path 115.

A concave groove 332 that extends over the entire circumferential periphery is formed in the outer peripheral surface of the projection portion 330, and the annular seal member 133, for example, constituted by an O-ring, is provided in the concave groove 332.

Figure 7:
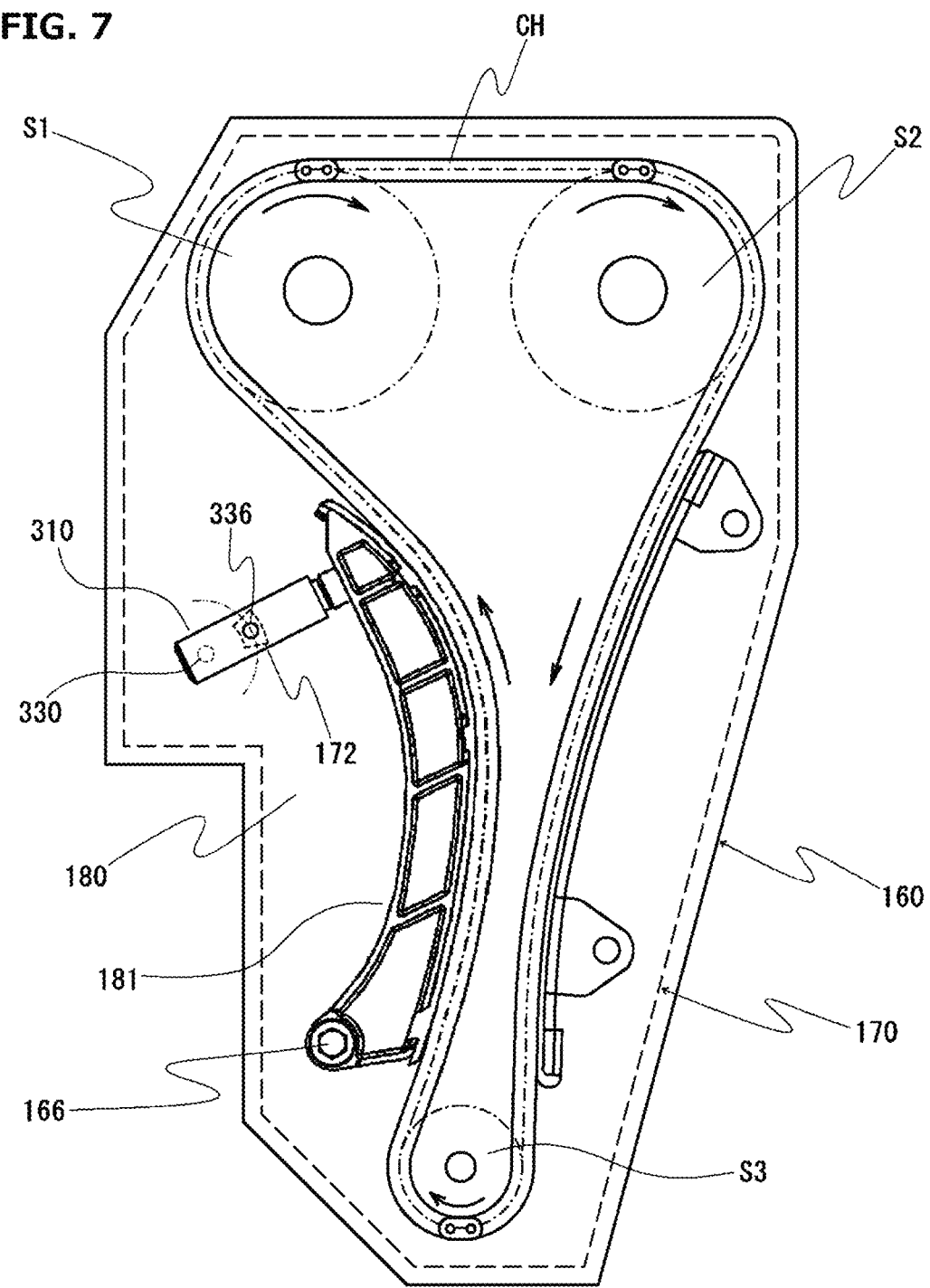
FIG. 7 is an explanatory view showing a timing system in which the tensioner according to the second embodiment of the present invention is incorporated.

The tensioner 310 of the present embodiment constitutes a chain tension-providing mechanism that is incorporated in a chain transmission device used in, e.g., a timing system of an automobile engine or the like and, as shown in FIG. 7, the tensioner 310 is mounted to the engine block 160 serving as the mounting target object, provides proper tension to a loose side of a transmission chain CH wound around a plurality of sprockets S1 to S3 via a tensioner lever 181, and prevents vibrations generated during running.

A chain tension-providing mechanism 180 is constituted by the tensioner lever 181 that slidably guides the traveling transmission chain CH, and the tensioner 310 that biases the tensioner lever 181 in the direction of the transmission chain CH, and provides tension to the transmission chain CH. The tensioner lever 181 is mounted so as to be swingable around a pivotal shaft 166, which is provided so as to stand on the surface 161 for mounting a tensioner in the engine block 160, and the tensioner lever 181 includes a plunger contact section with which the plunger 340 in the tensioner 310 comes into contact in a pressable manner.

Figure 8:
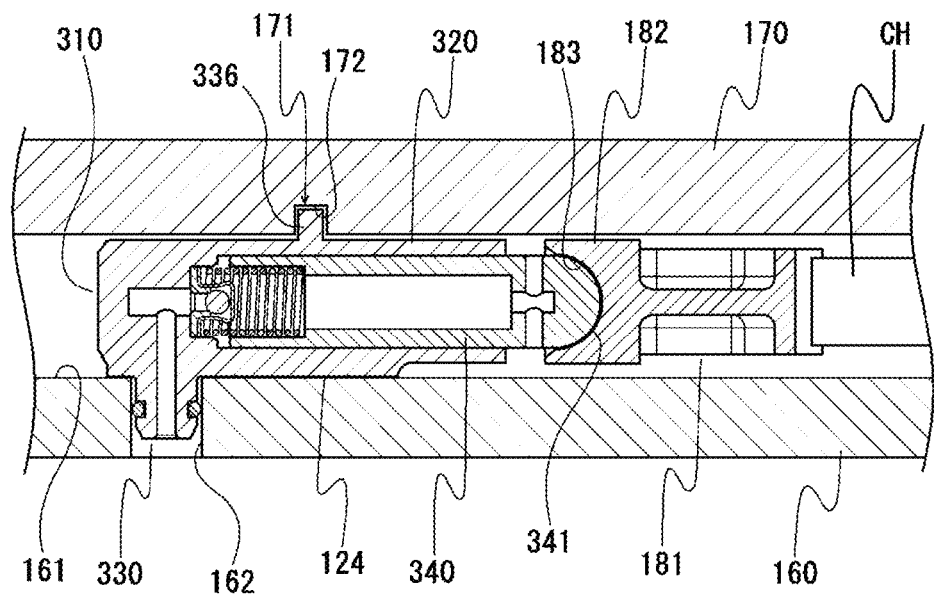
FIG. 8 is a cross-sectional view schematically showing the mounting structure of the tensioner to be fitted to an engine block.

Specifically describing the mounting structure of the tensioner 310, as shown in FIG. 8, the tensioner 310 is mounted to the engine block 160 in a state where the projection portion 330 in the tensioner body 320 is inserted into the oil discharge hole 162 formed in the surface 161 for mounting a tensioner in the engine block 160, and the other surface of the base section 323 in the tensioner body 320 will be joined to the surface 161 for mounting a tensioner of the engine block 160. In this state, a chain case 170 that covers the transmission chain CH and forms a chain housing chamber inside the chain case 170 is mounted to the engine block 160. As a result, the tensioner 310 is sandwiched between the engine block 160 and the chain case 170 and is held. The chain case 170 is configured to function also as a tensioner holding member.

As described above, in the tensioner 310 of the present embodiment, since the tensioner body 320 does not have the mounting section that needs a fixing bolt, and the projection portion 330 has the cylindrical shape, it follows that the tensioner body 320 according to the present embodiment is configured to swing around the projection portion 330 with respect to the engine block 160 serving as the mounting target object.

Thus, in the tensioner 310 of the present embodiment, the tensioner body 320 is configured to have the swing prevention structure section 335. The swing prevention structure section 335 is configured to be engaged with one of the chain case 170 functioning also as the tensioner holding member and the engine block 160 serving as the mounting target object to prevent the swing. Specifically, an engagement structure between the swing prevention structure section 335 and an engagement section formed in one of the chain case 170 and the engine block 160 is formed by an arc-shaped concave groove that extends along an arc having the projection portion 330 in the tensioner body 320 as the center, and a pillar-shaped projection portion that is movably interengaged with the concave groove by concave-convex engagement, and the swing prevention structure section 335 is configured to limit the swing range of the tensioner 310 such that the swing range thereof falls within the length range of the concave groove.

In the tensioner 310, in a cross section perpendicular to the mounting surface extending along the axial direction, a columnar projection portion 336 constituting the swing prevention structure section 335 is formed so as to extend in a direction opposite to the direction of extension of the projection portion 330 (an upward direction in FIG. 8) on the upper surface of the main body section 321 in the tensioner body 320. The columnar projection portion 336 is formed at a position deviating to an open-end side in the axial direction with respect to the projection portion 330.

The columnar projection portion 336 in the tensioner body 320 is movably interengaged, by concave-convex engagement, with an engagement section 171 constituted by a concave groove 172 that is formed so as to extend along an arc (indicated by a two-dot chain line in FIG. 7) having the projection portion 330 in the tensioner 310 as the center in the inner surface of the chain case 170.

Figure 9:
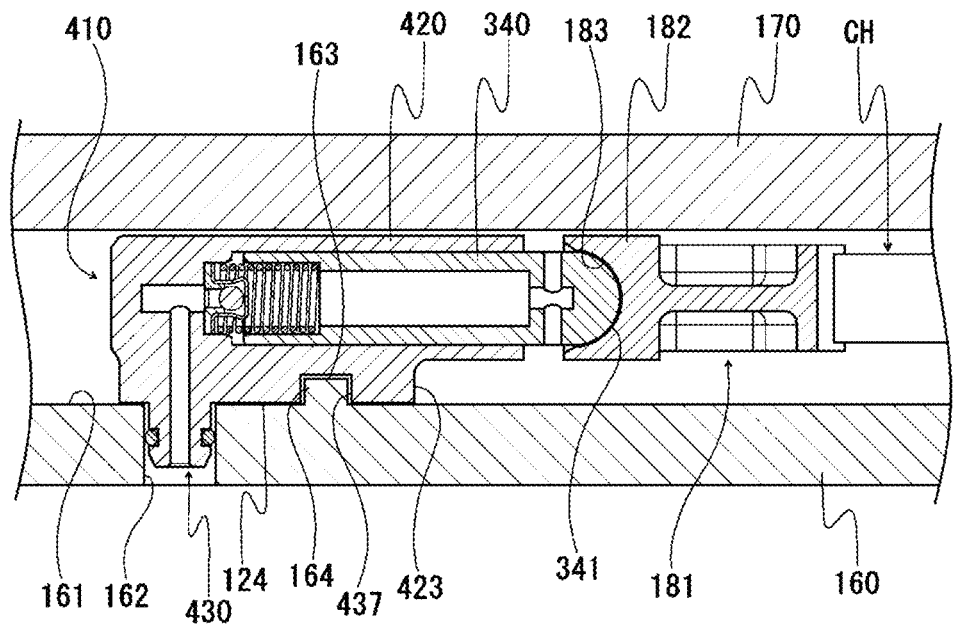
FIG. 9 is a cross-sectional view schematically showing the mounting structure of the tensioner to be fitted to the engine block.

Note that, for example, as shown in FIG. 9, the swing prevention structure section may be constituted by a concave groove 437 that is formed in the other surface of a base section 423 in a tensioner body 420 so as to extend along an arc having a projection portion 430 as the center. When such a tensioner 410 is used, the surface 161 for mounting a tensioner in the engine block 160 is provided with an engagement section 163 constituted by a columnar projection portion 164 that is movably engaged with the concave groove 437.

In the tensioner 310 according to the present embodiment, a contact surface 341 at the protrusion end of the plunger 340, which faces a plunger contact section 182 in the tensioner lever 181, is formed into a convex curved surface shape or a concave curved surface shape such that either one of the shapes of the contact surface 341 and the plunger contact section 182 should be convex and the other should be concave.

Figure 10:
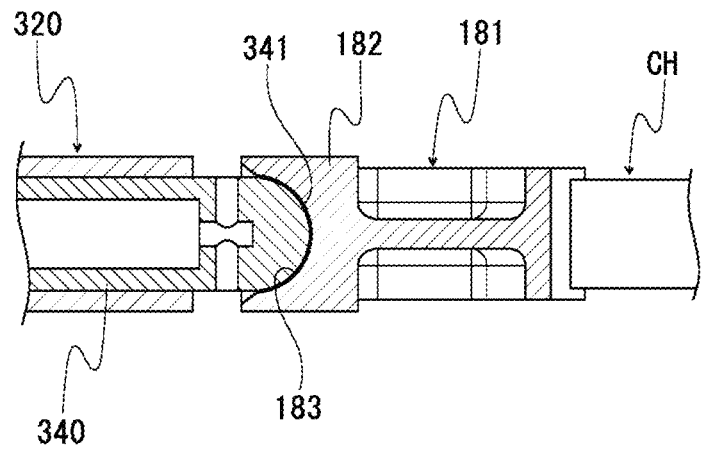
FIG. 10 is a conceptual view schematically showing a contact state between a plunger in the tensioner and a plunger contact section in a tensioner lever.

In this example, as shown in FIG. 10, the plunger contact section 182 in the tensioner lever 181 has a pressing surface 183 in a concave spherical shape, and the protrusion end of the plunger 340 in the tensioner 310 has the contact surface 341 in a convex spherical shape that fits the plunger contact section 182.

Note that, in the chain tension-providing mechanism according to the present invention, when the chain tension-providing mechanism is configured such that the plunger 340 can be always pressed against the center of the plunger contact section 182 in the tensioner lever 181, each of the shape of the contact surface 341 of the plunger 340 facing the plunger contact section 182 and the shape of the pressing surface 183 in the plunger contact section 182 may be any shape.

Figure 11A:
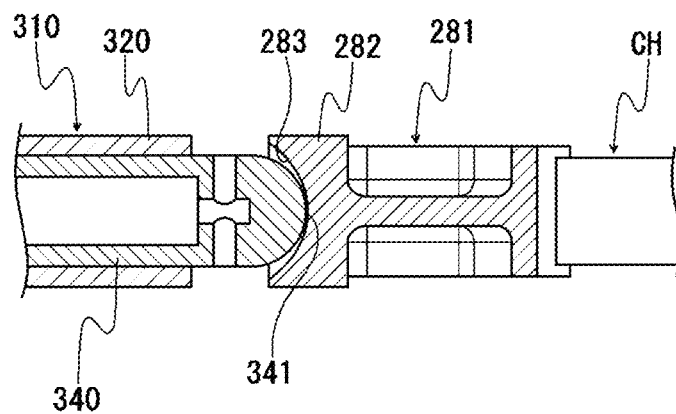
FIGS. 11A and 11B are conceptual views schematically showing the contact state between the plunger in the tensioner and the plunger contact section in the tensioner lever.

For example, as shown in FIG. 11A, a plunger contact section 282 in a tensioner lever 281 may have a pressing surface 283 in a concave curved surface shape that has a radius of curvature larger than that of the contact surface 341 at the protrusion end of the plunger 340.

Figure 11B:
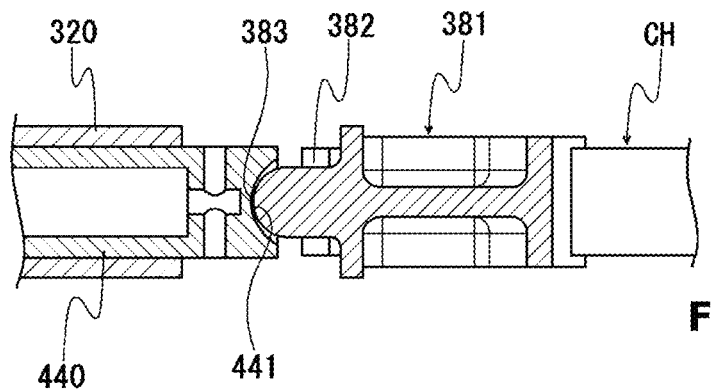

In addition, as shown in FIG. 11B, a plunger contact section 382 in a tensioner lever 381 may have a pressing surface 383 in a convex spherical shape, and the protrusion end of a plunger 440 may have a contact surface 441 in a concave curved surface shape that has a radius of curvature larger than that of the pressing surface 383 of the plunger contact section 382.

In the tensioner 310 according to the second embodiment, instead of adopting the configuration in which the tensioner body 320 that swings with respect to the engine block 160 has the swing prevention structure section 335, a configuration in which the entire chain tension-providing mechanism including the tensioner and the tensioner lever prevents the swing of the tensioner may be adopted.

Figure 12A:
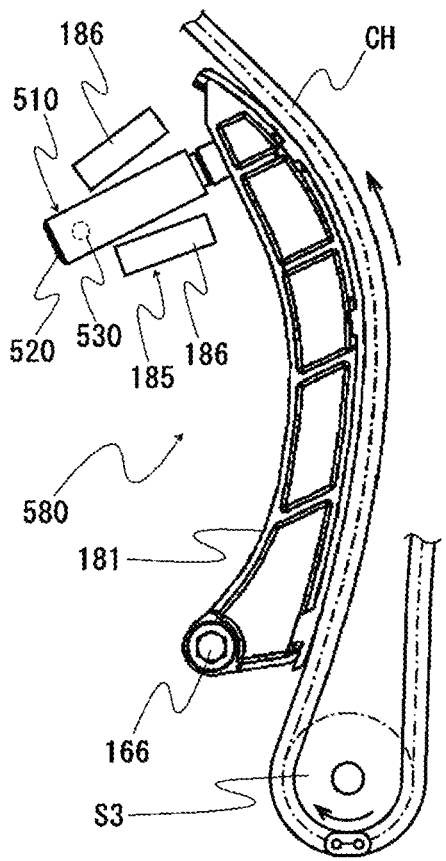
FIGS. 12A and 12B are explanatory views schematically showing an example of the configuration of a chain tension-providing mechanism including the tensioner according to the second embodiment of the present invention.

As shown in FIG. 12A, such a chain tension-providing mechanism 580 is constituted by the tensioner lever 181 that is provided so as to be swingable around the pivotal shaft 166, a tensioner 510 that biases the tensioner lever 181 in the direction of the transmission chain CH and provides tension to the transmission chain CH, and a swing prevention member 185 that prevents the swing of the tensioner 510.

The tensioner 510 has the same configuration as that of the tensioner 310 shown in FIGS. 5 and 6 except that a tensioner body 520 does not have the swing prevention structure section, and the tensioner body 520 is configured to swing around a projection portion 530 with respect to the engine block.

The swing prevention member 185 is configured to prevent the swing of the tensioner 510 by using contact of the side surfaces of the tensioner 510. In this example, the swing prevention member 185 is constituted by, e.g., a pair of plate-like members 186, and each of the plate-like members 186 is disposed so as to extend along the side surfaces of the tensioner 510 when the tensioner 510 is positioned at each end of the set swing range.

Note that the specific form of the swing prevention member 185 may be any form as long as the swing prevention member 185 can prevent the swing of the tensioner 510.

Figure 12B:
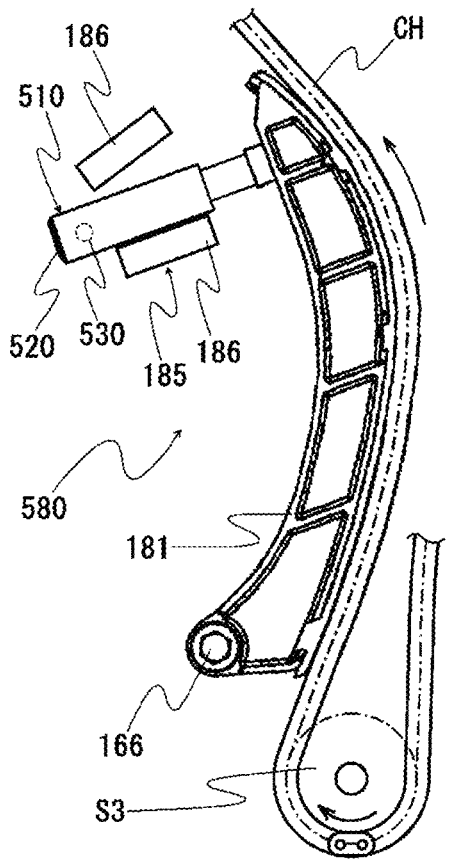

In the chain tension-providing mechanism 580, for example, as shown in FIG. 12B, when the transmission chain CH is stretched as it is used, the tensioner lever 181 swings around the pivotal shaft 166 and, in response to the swing, the tensioner 510 also rotates (swings) around the projection portion 530 in a direction in which a tensioner mounting angle is reduced.

However, by providing the swing prevention member 185, it is possible to prevent the tensioner 510 from being disconnected at the time of the first mounting of the tensioner 510 to the engine block 160 or at the time of maintenance, and to prevent the tensioner 510 from excessively rotating (swinging) due to the tension change of the transmission chain CH during the operation of the engine.

The tensioner according to the present invention may have a structure in which an oil reservoir chamber is provided inside the plunger, and oil is supplied to a pressure oil chamber from the oil reservoir chamber.

Figure 13:
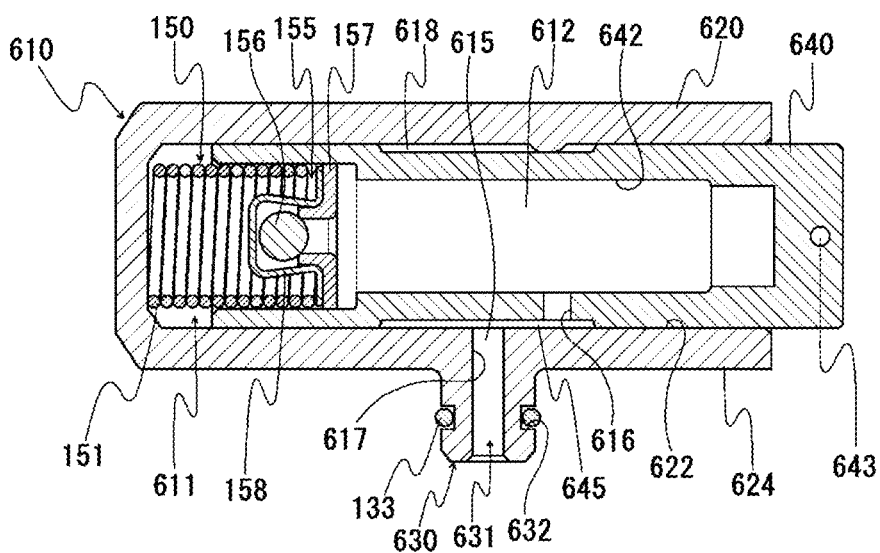
FIG. 13 is an axial cross-sectional view schematically showing another example of the configuration of the tensioner of the present invention.

FIG. 13 is an axial cross-sectional view schematically showing another example of the configuration of the tensioner according to the present invention.

A tensioner 610 according to the present embodiment includes a tensioner body 620 that has a plunger-receiving hole 622, one end of which is opened, and is provided with an oil supply path 615 for external pressure oil communicating with the plunger-receiving hole 622, a plunger 640 that is slidably inserted into the plunger-receiving hole 622, and the biasing unit 150 that biases the plunger 640 in the direction of protrusion from the plunger-receiving hole 622.

The tensioner body 620 has a mounting surface 624 constituted by a flat surface that is to be joined to the wall surface having the oil discharge hole in the mounting target object (a surface for mounting a tensioner) by metal touch.

The tensioner body 620 is provided with an oil introduction hole 617 that is opened at the side of the mounting surface 624, and forms the oil supply path 615 that causes the internal space of the plunger-receiving hole 622 and the external space to communication with each other.

The plunger 640 is formed into a cylindrical shape, and has a plunger hole 642 having an open rear end. The plunger hole 642 is constituted by a first space section positioned on the side of the open end, and a second space section that is connected to the first space section via a stepped section, extends forward in the axial direction, and has an inner diameter smaller than that of the first space section.

The plunger 640 includes an external relief hole 643 that communicates with the external space of the tensioner 610. One end of the external relief hole 643 is opened at the front top surface of the plunger hole 642, and the other end thereof is opened at the outer peripheral surface of the plunger 640.

In addition, in the outer peripheral surface of the plunger 640, an annular concave section 645 extending over the entire circumferential periphery is formed, and an oil supply hole 616 that is opened at the bottom surface of the annular concave section 645 and causes the internal space of the plunger hole 642 and the external space to communicate with each other is also formed.

The plunger 640 is inserted into the plunger-receiving hole 622 from its open-end side and is disposed, and an oil supply space 618 is formed of the inner surface of the annular concave section 645 and the inner surface of the plunger-receiving hole 622.

The check valve 155 is disposed in the first space section in the plunger hole 642, a pressure oil chamber 611 is formed between the plunger-receiving hole 622 and the first space section, and the second space section of the plunger hole 642 forms an oil reservoir chamber 612 that communicates with the external space via the oil supply hole 616, the oil supply space 618, and the oil introduction hole 617.

The check valve 155 is constituted by the check ball 156, the ball seat 157 having the seating section in which the check ball 156 is seated, and the retainer 158 that guides the check ball 156. Note that a ball spring to bias the check ball 156 to the side of the ball seat 157 may be disposed between the check ball 156 and the retainer 158.

The biasing unit 150 biases the plunger 640 to the front side and is constituted by, e.g., the coil spring 151.

The coil spring 151 is disposed in the pressure oil chamber 611 such that the coil axis extends along the central axis of the plunger 640.

The tensioner 610 has a projection portion 630 that forms an oil passage 631 connected to the oil supply path 615 on the mounting surface 624 of the tensioner body 620 to face the mounting target object.

The projection portion 630 has, e.g., a cylindrical shape and is formed integrally with the mounting surface 624 of the tensioner body 620 which will face the mounting target object such that the oil passage 631 formed of the internal space the projection portion 630 is connected to the oil supply hole 616 constituting the oil supply path 615.

A concave groove 632 that extends over the entire circumferential periphery is formed in the outer peripheral surface of the projection portion 630, and the annular seal member 133, for example, constituted by an O-ring, is provided in the concave groove 632.

In the tensioner 610 of the present embodiment, the tensioner body 620 may have a configuration in which the mounting section having the mounting hole into which the fixing bolt or the like is inserted is provided and, when the swing prevention structure section 335 is provided as in the tensioner 310 according to the second embodiment described above, the tensioner body 620 may also have a configuration in which the mounting section that uses the fixing bolt or the like is not provided.

Although the embodiments of the present invention have been described in detail, the present invention is not limited to the above embodiments, and various design changes can be made without departing from the present invention recited in claims.

For example, the tensioner may be configured by combining any of the individual configurations of a plurality of the embodiments described above.

In addition, in each of the embodiments described above, although the description has been made on the assumption that the tensioner is incorporated in the timing system for the automobile engine, the specific use of the tensioner is not limited thereto.

Further, in each of the embodiments described above, although the description has been made on the assumption that the tensioner provides the tension to the transmission chain via the tensioner lever, the transmission chain may be slidably guided directly by the tip of the plunger, and the tension may be thereby provided to the transmission chain.

Furthermore, the application of the present invention is not limited to the transmission mechanism that uses the transmission chain and the present invention may be applied to similar transmission mechanisms that use a rope and a belt, and it is possible to use the present invention in various industrial fields when the required use is for providing tension to a long object.

What is claimed is:

1. A tensioner comprising:
a tensioner body provided with an oil supply path for external pressure oil formed therein, the oil supply path communicating with a plunger-receiving hole, one end of which is opened;
a plunger slidably inserted into the plunger-receiving hole; and
a biasing unit to bias the plunger in a protruding direction of the plunger from the plunger-receiving hole, wherein
the tensioner body has a projection portion on a mounting surface configured to face a wall surface having an oil discharge hole in a mounting target object, the projection portion being configured to be inserted into the oil discharge hole and to be continuously connected to the oil supply path to form an oil passage,
the tensioner body has a base section and a main body section that is formed integrally on one surface of the base section and having the plunger-receiving hole opened on one side along one surface of the base section,
the mounting surface to the wall surface in the mounting target object is constituted by the other surface of the base section,
the projection portion is formed integrally with the mounting surface of the tensioner body, and
the projection portion is configured to be inserted into the oil discharge hole so as to enable side sealing.

2. The tensioner according to claim 1, wherein
the projection portion is cylindrical, and an annular seal member is provided on an outer peripheral surface of the projection portion.

3. The tensioner according to claim 1, wherein
the tensioner body is configured to swing around the projection portion with respect to the mounting target object and has a swing prevention structure section, and
the swing prevention structure section is configured to be engaged with one of the mounting target object or a tensioner holding member that sandwiches the tensioner between the tensioner holding member and the mounting target object to prevent swing of the tensioner body.

4. The tensioner according to claim 3, wherein
an engagement structure between the swing prevention structure section and an engagement section in the tensioner holding member or the mounting target object is constituted of an arc-shaped concave groove that extends along an arc around the projection portion, and a pillar-shaped projection portion configured to be movably engaged with the concave groove, and
the swing prevention structure section is configured to limit a swing range of the tensioner so as to be within a range in length of the concave groove.

5. The tensioner according to claim 1, wherein
a contact surface on a protrusion end of the plunger, the contact surface facing a plunger contact section with which the plunger comes into contact in a pressable manner, is formed into a convex curved surface shape or a concave curved surface shape such that either one of the shapes of the contact surface and the plunger contact section should be convex and the other should be concave.

* * * * *